(12) United States Patent
Nagakura et al.

(10) Patent No.: US 9,663,103 B2
(45) Date of Patent: May 30, 2017

(54) VEHICLE, CONTROL APPARATUS FOR VEHICLE, AND CONTROL METHOD FOR VEHICLE

(71) Applicants: Keisuke Nagakura, Anjo (JP); Akihiro Katayama, Toyota (JP)

(72) Inventors: Keisuke Nagakura, Anjo (JP); Akihiro Katayama, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/411,293

(22) PCT Filed: Aug. 22, 2013

(86) PCT No.: PCT/IB2013/001813
§ 371 (c)(1),
(2) Date: Dec. 24, 2014

(87) PCT Pub. No.: WO2014/033520
PCT Pub. Date: Mar. 6, 2014

(65) Prior Publication Data
US 2015/0314779 A1 Nov. 5, 2015

(30) Foreign Application Priority Data

Aug. 27, 2012 (JP) .................................. 2012-186254

(51) Int. Cl.
*B60W 10/08* (2006.01)
*B60W 10/06* (2006.01)
(Continued)

(52) U.S. Cl.
CPC ............ *B60W 20/50* (2013.01); *B60W 10/06* (2013.01); *B60W 10/08* (2013.01); *B60W 20/13* (2016.01);
(Continued)

(58) Field of Classification Search
None
See application file for complete search history.

(56) References Cited

U.S. PATENT DOCUMENTS

2001/0051848 A1 12/2001 Ito
2002/0002858 A1* 1/2002 Hatano .................. G01M 15/11
73/114.05
(Continued)

FOREIGN PATENT DOCUMENTS

GB 2 323 927 A 10/1998
JP 2001-349239 A 12/2001
(Continued)

*Primary Examiner* — Rami Khatib
*Assistant Examiner* — Jeffrey Boomer
(74) *Attorney, Agent, or Firm* — Sughrue Mion, PLLC

(57) ABSTRACT

A vehicle includes an engine, a motor, a battery that stores an electric power for driving the motor, and a control apparatus. The control apparatus is configured to control the engine and the motor in one of control modes, the control mode includes a charge sustaining (CS) mode and a charge depleting (CD) mode. During the CS mode, a first determination is made to determine that the engine malfunction has occurred when a number of times of abnormal combustion occurring during a current trip is equal to or larger than a threshold. During the CD mode, instead of or in addition to the first determination, a second determination is made to determine that the engine malfunction has occurred when a cumulative number of times of abnormal combustion is equal to or larger than the threshold.

7 Claims, 7 Drawing Sheets

(51) Int. Cl.
  *B60W 50/02* (2012.01)
  *B60W 50/00* (2006.01)
  *F02N 11/08* (2006.01)
  *F02D 41/22* (2006.01)
  *B60W 20/50* (2016.01)
  *B60W 20/13* (2016.01)

(52) U.S. Cl.
  CPC ......... *B60W 50/0225* (2013.01); *F02D 41/22* (2013.01); *F02N 11/0818* (2013.01); *B60W 2050/0089* (2013.01); *B60W 2050/021* (2013.01); *B60W 2510/06* (2013.01); *B60W 2510/244* (2013.01); *B60W 2710/06* (2013.01); *B60W 2710/08* (2013.01); *F02D 2200/1015* (2013.01); *F02N 11/0814* (2013.01); *F02N 2200/061* (2013.01); *Y02T 10/48* (2013.01); *Y02T 10/6269* (2013.01); *Y10S 903/93* (2013.01)

(56) References Cited

U.S. PATENT DOCUMENTS

| | | | | |
|---|---|---|---|---|
| 2004/0084234 A1* | 5/2004 | Yatabe | ............... | B60K 6/445 180/65.235 |
| 2007/0101806 A1* | 5/2007 | Yamaguchi | ............ | B60K 6/365 73/114.04 |
| 2010/0152940 A1* | 6/2010 | Mitsutani | ............... | B60K 6/445 701/22 |
| 2011/0276213 A1* | 11/2011 | Tomatsuri | ............. | B60K 6/365 701/22 |
| 2012/0016547 A1* | 1/2012 | Aridome | ............... | B60K 6/445 701/22 |
| 2012/0046814 A1* | 2/2012 | Sugimoto | ............. | B60K 6/445 701/22 |
| 2012/0197471 A1* | 8/2012 | Irisawa | ................. | B60K 6/445 701/22 |
| 2013/0030634 A1* | 1/2013 | Endo | ....................... | B60K 6/46 701/22 |
| 2013/0297137 A1 | 11/2013 | Fushiki et al. | | |
| 2014/0263238 A1* | 9/2014 | Ulrich | .................. | B23K 9/095 219/130.21 |
| 2015/0246671 A1* | 9/2015 | Imamura | ............... | B60K 6/445 701/22 |

FOREIGN PATENT DOCUMENTS

| | | |
|---|---|---|
| JP | 2012-036767 A | 2/2012 |
| JP | 2012-040989 A | 3/2012 |
| WO | 2011/125184 A1 | 10/2011 |
| WO | 2012/101797 A1 | 8/2012 |

* cited by examiner

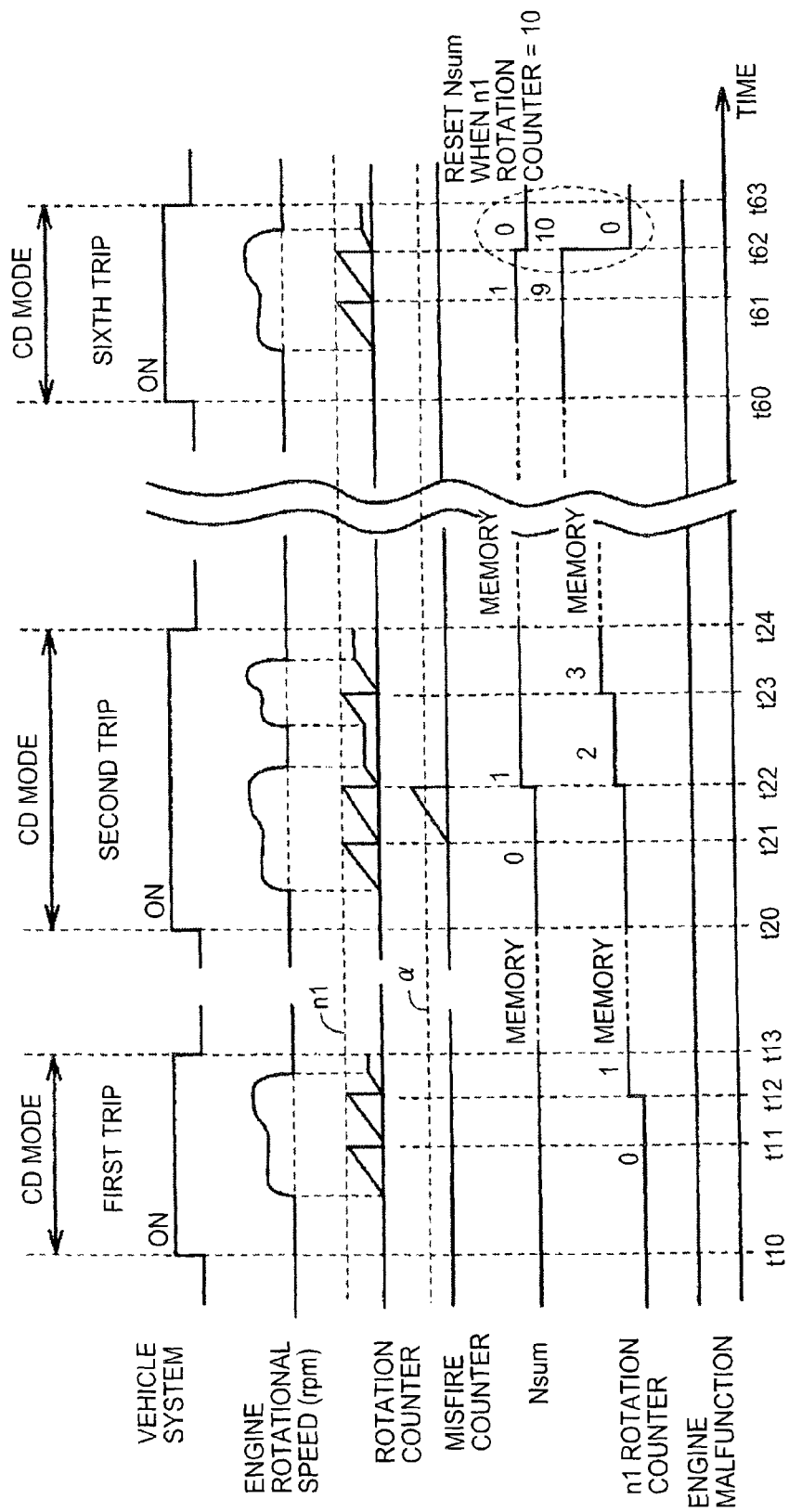

VEHICLE, CONTROL APPARATUS FOR VEHICLE, AND CONTROL METHOD FOR VEHICLE

BACKGROUND OF THE INVENTION

1. Field of the Invention

The invention relates to a vehicle, and more particularly, to an art of determining whether or not there is a malfunction in an engine that is mounted on the vehicle.

2. Description of Related Art

In Japanese Patent Application Publication No. 2012-36767 (JP-2012-36767 A), there is disclosed an art of performing idle-up control in determining, on the basis of a combustion state of an engine during a period in which the engine rotates a predetermined reference number of times, whether or not there is a malfunction in the engine to thereby make a time required for the determination on the malfunction shorter than during normal idling.

In recent years, vehicles (so-called plug-in hybrid vehicles) that run by at least one of a motive power of a motor and a motive power of an engine and allow a battery, which stores an electric power to be supplied to the motor, to be charged with an electric power from a vehicular external power supply have been put into practical use.

In each of the plug-in hybrid vehicles, a mode (a CD mode) in which the engine is not allowed to be driven to hold a state of charge (an SOC) of the battery within a predetermined range is selected until the SOC of the battery falls to a lower limit. Thus, the frequency with which the engine operates is relatively low until the SOC of the battery falls to the lower limit. On the other hand, a mode (a CS mode) in which the engine is allowed to be driven to hold the SOC of the battery within the predetermined range is selected after the SOC of the battery has fallen to the lower limit. Thus, the frequency with which the engine operates is relatively high after the SOC of the battery has fallen to the lower limit.

In such a plug-in hybrid vehicle, for example, in the case where the vehicle runs a short distance from an almost fully charged state of the battery, the CD mode may be selected in an almost entire period during one trip (a period from activation of a vehicle system to subsequent stop thereof). In this case, the frequency with which the engine operates is low. Thus, the number of times of rotation of the engine during one trip may not reach a reference number of times, so that a malfunction in the engine may be detected with delay. In this case, when idle-up is carried as described in Japanese Patent Application Publication No. 2012-36767 (JP-2012-36767 A), a deterioration in fuel economy or emission properties may be temporarily caused.

SUMMARY OF THE INVENTION

The invention provides an art of making a determination on a malfunction in an engine in an early stage.

In a first aspect of the invention, a vehicle includes an engine, a motor, a battery storing an electric power for driving the motor, and a control apparatus. The control apparatus is configured to control the engine and the motor in one of control modes, the control modes includes a charge sustaining mode in which the engine is allowed to be driven to hold a state of charge of the battery within a predetermined range, and a charge depleting mode in which the engine is not allowed to be driven to hold the state of charge of the battery within the predetermined range. The control apparatus is configured to execute a first determination to determine that the engine malfunction has occurred when a number of times of abnormal combustion occurring during a current trip is equal to or larger than a threshold, during the charge sustaining mode. The control apparatus is configured to execute a second determination to determine that the engine malfunction has occurred when a cumulative number of times of abnormal combustion is equal to or larger than the threshold, the second determination being executed instead of or in addition to the first determination during the charge depleting mode, the cumulative number of times of abnormal combustion is obtained by adding a number of times of abnormal combustion occurring during a past trip to the number of times of abnormal combustion occurring during the current trip.

In the vehicle, the control apparatus may reset the cumulative number of times of abnormal combustion when a cumulative number of times of rotation of the engine since the past trip reaches a predetermined number of times of rotation.

In the vehicle, the control apparatus may determine whether or not there is a abnormal combustion every time the engine rotates a reference number of times, and may increase the number of times of abnormal combustion occurring during the current trip every time it is determined that there is a abnormal combustion.

The vehicle may be a plug-in hybrid vehicle in which the battery can be charged with an electric power of an external power supply.

In a second aspect of the invention, a control apparatus for a vehicle is equipped with an engine, a motor, and a battery. The control apparatus includes an electronic control unit. The electronic control unit is configured to control the engine and the motor in one of control modes, the control modes includes a charge sustaining mode in which the engine is allowed to be driven on a basis of a state of charge of the battery, and a charge depleting mode in which the engine is not allowed to be driven on a basis of the state of charge of the battery. The electronic control unit is configured to execute a first determination to determine that the engine malfunction has occurred when a number of times of abnormal combustion occurring during a current trip is equal to or larger than a threshold, during the charge sustaining mode. The electronic control unit is configured to execute a second determination to determine that the engine malfunction has occurred when a cumulative number of times of abnormal combustion is equal to or larger than the threshold, the second determination being executed instead of or in addition to the first determination during the charge depleting mode, the cumulative number of times of abnormal combustion is obtained by adding a number of times of abnormal combustion occurring during a past trip to the number of times of abnormal combustion occurring during the current trip.

In a third aspect of the invention, a control method for a vehicle that is equipped with an engine, a motor, and a battery includes controlling the engine and the motor in one of control modes, the control modes includes a charge sustaining mode in which the engine is allowed to be driven on a basis of a state of charge of the battery, and a charge depleting mode in which the engine is not allowed to be driven on a basis of the state of charge of the battery, making a first determination to determine that the engine malfunction has occurred when a number of times of abnormal combustion occurring during a current trip is equal to or larger than a threshold, during the charge sustaining mode, and making a second determination to determine that the engine malfunction has occurred when a cumulative number of times of abnormal combustion is equal to or larger than the threshold, the second determination being executed instead of or in addition to the first determination during the charge depleting mode, the cumulative number of times of abnormal combustion is obtained by adding a number of times of abnormal combustion occurring during a past trip to the number of times of abnormal combustion occurring during the current trip.

According to the invention, a determination on an abnormality in the engine can be made in an early stage.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein:

FIG. 7 is a view for illustrating a processing of resetting a cumulative number of times of abnormal combustion Nsum according to the embodiment of the invention.

DETAILED DESCRIPTION OF EMBODIMENT

The embodiment of the invention will be described hereinafter with reference to the drawings. In the following description, like components are denoted by like reference symbols respectively. The components denoted by the same reference symbol are identical in name and function as well. Accordingly, detailed description of those components will not be repeated.

Figure 1:
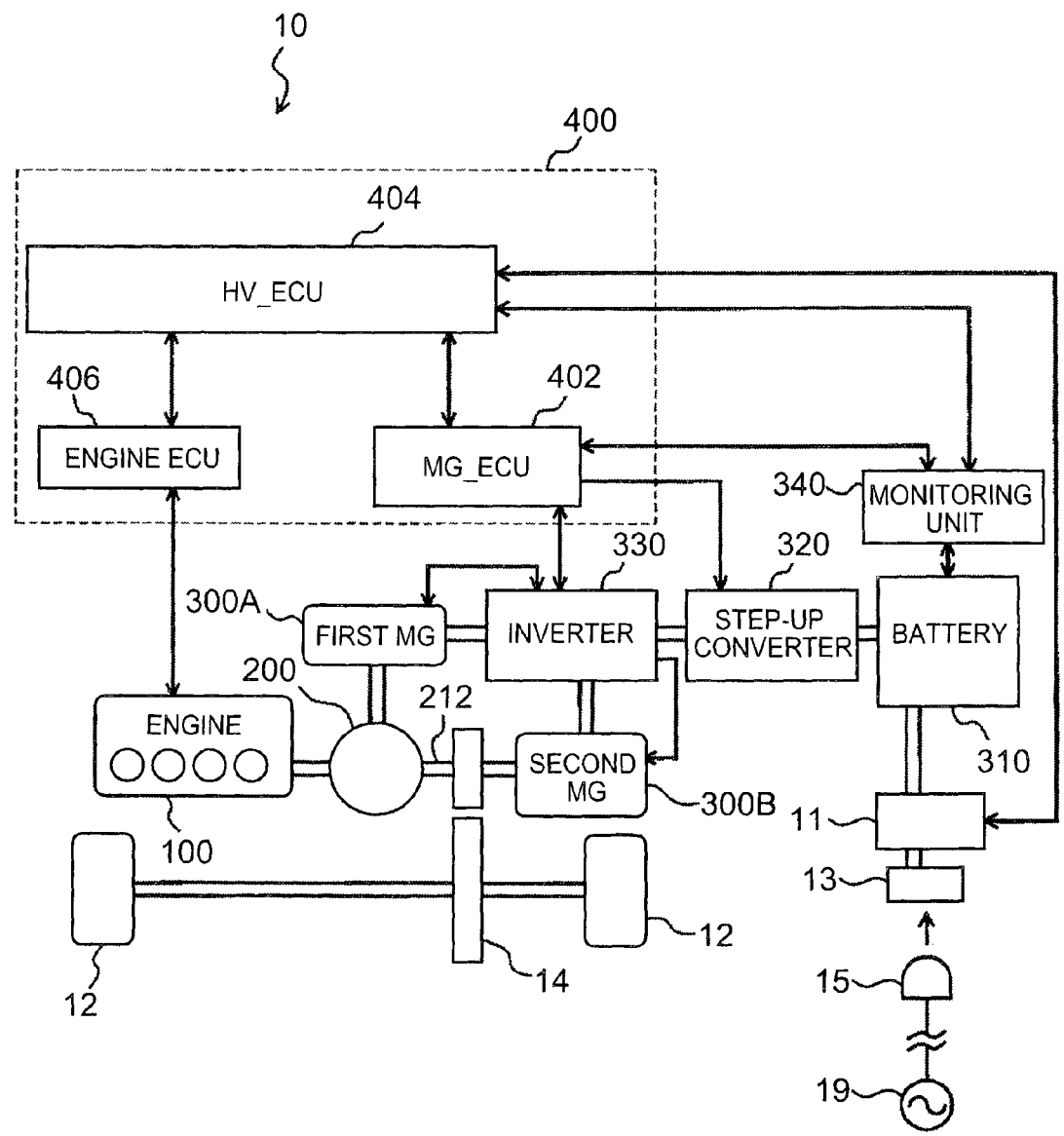
FIG. 1 is a schematic configuration diagram of a vehicle according to the embodiment of the invention.

FIG. 1 is a schematic configuration diagram of a vehicle 10 according to the embodiment of the invention. The vehicle 10 is a so-called plug-in hybrid vehicle. That is, the vehicle 10 is a vehicle (a so-called hybrid vehicle) that runs by at least one of a motive power of an engine 100 and a motive power of a second motor-generator (hereinafter referred to as "a second MG") 300B, and is a vehicle (a so-called plug-in vehicle) in which a battery 310 that stores an electric power to be supplied to the second MG 300B can be charged with an electric power from an external power supply 19 such as a commercial power supply or the like. The vehicle 10 is not necessarily limited to a plug-in vehicle, but may be a normal, hybrid vehicle.

In addition to the aforementioned engine 100, the aforementioned second MG 300B, and the aforementioned battery 310, the vehicle 10 includes a first motor-generator (hereinafter referred to as "a first MG") 300A, a motive power split mechanism 200, a speed reducer 14, an inverter 330, a step-up converter 320, an electronic control unit (an ECU), 406 of the engine, an MG_ECU 402, an HV_ECU 404, and the like.

The motive power split mechanism 200 is constituted by a planetary gear that includes a sun gear, a pinion gear, a carrier, and a ring gear. The motive power split mechanism 200 splits (distributes) a motive power generated by the engine 100 to an output shaft 212 and the first MG 300A.

The first MG 300A generates an electric power through the use of the motive power of the engine 100 split by the motive power split mechanism 200. The electric power generated by the first MG 300A through the use of the motive power of the engine 100 is used to charge the battery 310 or drive the second MG 300B.

The second MG 300B generates a driving force through the use of at least one of an electric power stored in the battery 310 and an electric power generated by the first MG 300A. Then, the driving force of the second MG 300B is transmitted to driving wheels 12 via the speed reducer 14. During braking of the vehicle or the like, the second MG 300B is driven by the driving wheels 12 via the speed reducer 14, and the second MG 300B generates an electric power in a regenerative manner.

The inverter 330 performs current control while converting a direct current of the battery 310 and an alternating current of the first MG 300A, or a direct current of the battery 310 and an alternating current of the second MG 300B.

The step-up converter 320 carries out voltage conversion between the battery 310 and the inverter 330.

The engine ECU 406 controls the operation state of the engine 100. The MG_ECU 402 controls the charge/discharge states and the like of the first MG 300A, the second MG 300B, the inverter 330 and the battery 310 in accordance with the state of the vehicle 10. The HV_ECU 404 controls an entire system (hereinafter referred to simply as "a vehicle system") that mutually manages and controls the engine ECU 406, the MG_ECU 402, and the like to cause the vehicle 10 to run such that the vehicle 10 can efficiently run.

Furthermore, the vehicle 10 includes a connector 13 and a charger 11. The connector 13 is configured to be connectable to a connector 15 from the external power supply 19. The charger 11 converts an electric power from the external power supply 19 into a direct current, and outputs the direct current to the battery 310. The charger 11 controls the amount of electric power with which the battery 310 is charged, in accordance with a control signal from the HV_ECU 404.

In FIG. 1, the respective ECU's are separately configured. However, an ECU may be configured by integrating two or more ECU's. For example, as indicated by a dotted line in FIG. 1, an ECU 400 may be configured by integrating the MG_ECU 402, the HV_ECU 404, and the engine ECU 406. In the following description, the ECU 400 will be referred to as such without distinguishing among the MG_ECU 402, the HV_ECU 404, and the engine ECU 406.

The ECU 400 has a central processing unit (a CPU) (not shown) and a memory (not shown) built-in, and is configured to perform a predetermined arithmetic processing on the basis of a map and a program that are stored in the memory.

Signals from a vehicle speed sensor (not shown), an accelerator opening degree sensor (not shown), a throttle opening degree sensor (not shown), and a monitoring unit 340 that monitors a state (a voltage, a current, a temperature and the like) of the battery 310 are input to the ECU 400.

Figure 2:
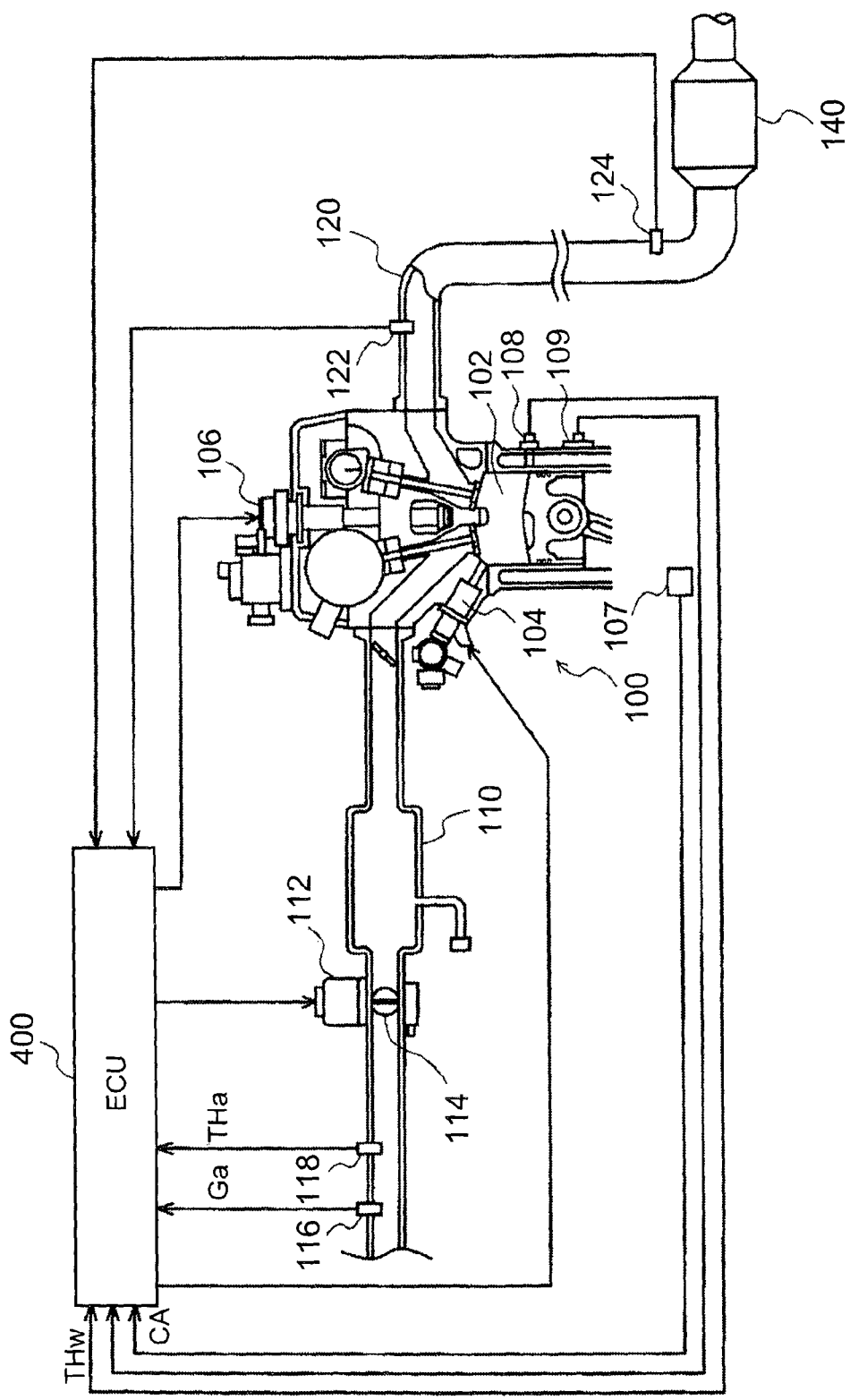
FIG. 2 is a view showing an engine and peripheral components thereof according to the embodiment of the invention.

FIG. 2 is a view showing the engine 100 and peripheral components thereof. Although one cylinder is shown in FIG. 2, a plurality of cylinders are provided in the engine 100 in this embodiment of the invention.

In this engine 100, air that is sucked from an air cleaner (not shown) flows through an intake pipe 110, and is introduced into a combustion chamber 102. In accordance with an operation amount of a throttle valve 114 that is controlled by a throttle motor 112, the amount of air introduced into the combustion chamber 102 is adjusted.

An injector 104 injects fuel stored in a fuel tank (not shown) into the combustion chamber 102. Fuel may be injected from the injector 104 into an intake passage.

A mixture of the air introduced from the intake pipe 110 and fuel injected from the injector 104 is ignited through the use of an ignition coil 106, and combust.

Exhaust gas after the combustion of the mixture is purified by a catalyst 140 that is provided halfway in an exhaust pipe 120, and is emitted to the atmosphere.

Signals from an angle sensor 107, a coolant temperature sensor 108, a vibration sensor 109, an airflow meter 116, an air temperature sensor 118, an air-fuel ratio sensor 122, and an oxygen sensor 124 are input to the ECU 400. The angle sensor 107 detects a rotational angle (a crank angle) CA of a crankshaft of the engine 100. The coolant temperature sensor 108 detects a temperature THw of engine coolant. The vibration sensor 109 detects vibrations of a cylinder block of the engine 100. The airflow meter 116 detects an amount Ga of air sucked into the engine 100 per unit time. The air temperature sensor 118 detects a temperature THa of intake air. The air-fuel ratio sensor 122 detects an air-fuel ratio A/F in exhaust gas. The oxygen sensor 124 detects a concentration of oxygen in exhaust gas. These respective sensors transmit signals indicating detection results to the ECU 400.

The ECU 400 controls the ignition coil 106 (an ignition timing), the throttle motor 112 (a throttle opening degree), and the injector 104 (a fuel injection amount) on the basis of signals sent from the respective sensors and the like.

Figure 3:
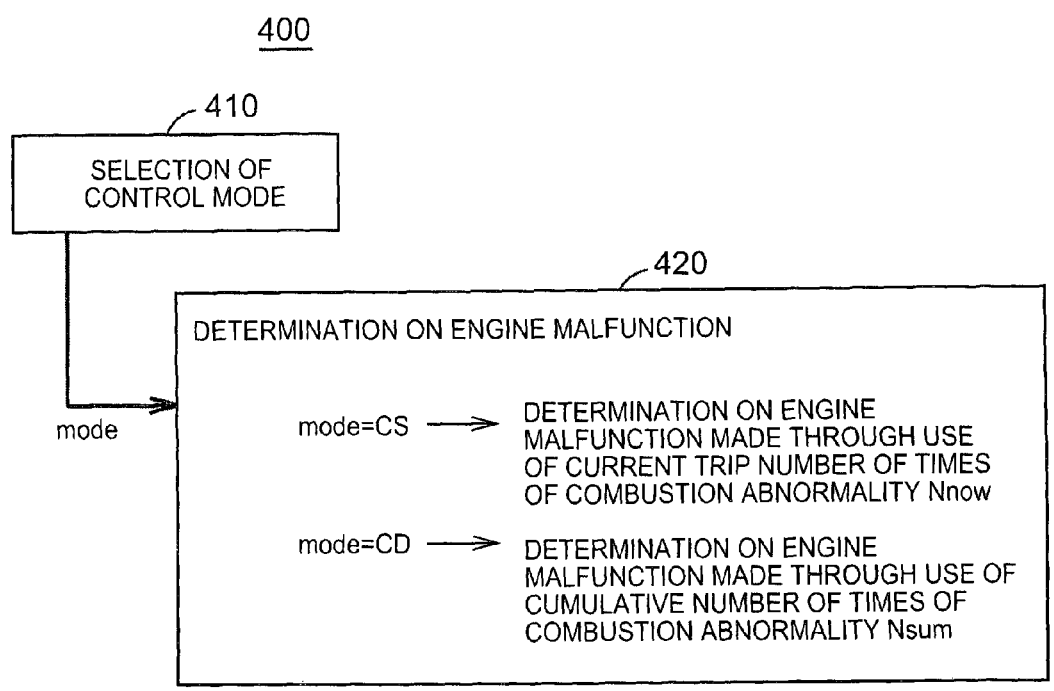
FIG. 3 is a functional block diagram of an ECU according to the embodiment of the invention.

FIG. 3 is a functional block diagram of that region of the ECU 400 which concerns the selection of a control mode and a determination on a malfunction in the engine. Respective functional blocks shown in FIG. 3 may be realized by either hardware or software.

The ECU 400 is equipped with a control mode selection unit 410 and an engine malfunction determination unit 420. First of all, the control mode selection unit 410 will be described. The control mode selection unit 410 selects one control mode from a charge depleting mode (hereinafter referred to as "a CD mode") and a charge sustaining mode (hereinafter referred to as "a CS mode"), and causes the vehicle 10 to run in the selected control mode. The number of control modes should not be limited to two, but may be three or more.

The CD mode is a mode in which higher priority is given to the depletion of the electric power with which the battery 310 is charged than to the sustainment thereof. Thus, during the CD mode, the engine 100 is not allowed to be driven to hold a state of charge (an SOC) of the battery 310 within a predetermined range. Accordingly, during the CD mode, in principle, EV running (the engine 100 is stopped and the motive power of the second MG 300B is used to run the vehicle) is carried out. However, at the time of high load (e.g., when a torque required by a user exceeds a predetermined value), HV running (using both the motive power of the second MG and the motive power of the engine 100) is carried out even during the CD mode.

On the other hand, the CS mode is a mode in which higher priority is given to the sustainment of the electric power of the battery 310 than to the depletion thereof. Thus, during the CS mode, in addition to the time of high load, the engine 100 is allowed to be driven to hold the SOC within a predetermined range (e.g., a range from 30% to 60%). That is, during the CS mode, HV running is carried out not only at the time of high load but also when the first MG is required to generate an electric power through the use of a motive power of the engine 100 to hold the SOC within the predetermined range. Accordingly, the frequency with which the engine 100 operates is higher during the CS mode than during the CD mode.

The control mode selection unit 410 holds the control mode in the CD mode until the SOC falls to a lower limit (e.g., 10%) during a current trip. After the SOC has fallen to the lower limit, the control mode selection unit 410 changes over the control mode to the CS mode, and holds the CS mode until the current trip ends. Incidentally, "the trip" mentioned herein means a unit representing a running period of the vehicle, and usually means a period from activation of the vehicle system to subsequent stop thereof.

Next, the engine malfunction determination unit 420 will be described. The engine malfunction determination unit 420 determines whether or not there is an abnormality in which the number of times of misfire during a period in which the engine 100 rotates a predetermined reference number of times n1 exceeds a predetermined value α (hereinafter referred to as "an abnormal combustion") every time the engine 100 rotates the reference number of times n1. Then, the engine malfunction determination unit 420 counts the number of times of determination that there is an abnormal combustion (hereinafter referred to as "the number of times of abnormal combustion"), and determines that the engine 100 malfunction is occurred when the number of times of abnormal combustion is equal to or larger than a threshold number of times N1. This series of processes will be referred to hereinafter also as "an malfunction determination processing". As is apparent from the foregoing description, in order to appropriately determine whether or not there is a malfunction in the engine 100 in the malfunction determination processing, the engine 100 needs to be rotated at least n1×N1 times (e.g., 1000×4=4000 times when n1=1000 and N1=4) or more. This number of times n1×N1 will be referred to hereinafter also as "the required determination number of times of rotation".

When it turns out as a result of the malfunction determination processing that the engine 100 malfunction is occurred, the engine malfunction determination unit 420 lights up a malfunction indicator light (an MIL), and notifies a user thereof.

The engine malfunction determination unit 420 changes over the contents of the malfunction determination processing in accordance with the control mode selected by the control mode selection unit 410.

When the engine 100 is in the CS mode, the engine malfunction determination unit 420 performs "a CS malfunction determination processing" to determine, through the use of the number of times of abnormal combustion during a current trip (hereinafter referred to also as "a current trip number of times of abnormal combustion Nnow"), whether or not there is a malfunction in the engine. More specifically, when the current trip number of times of abnormal combustion Nnow is equal to or larger than the threshold number of times N1, the engine malfunction determination unit 420 determines that the engine 100 malfunction is occurred. Otherwise, the engine malfunction determination unit 420 determines that the engine 100 is normal.

During the CS mode, the frequency with which the engine 100 operates is higher than during the CD mode, and therefore, the engine 100 is likely to rotate the determination required number of times of rotation (=n1×N1 times) or more during the current trip. In this embodiment of the invention, during the CS mode, the malfunction determination processing is performed through the use of the current trip number of times of abnormal combustion Nnow. Thus, it can be appropriately determined in an early stage whether or not there is an malfunction in the engine 100.

On the other hand, when the engine 100 is in the CD mode, the engine malfunction determination unit 420 performs "a CD malfunction determination processing" to determine, through the use of a number of times obtained by adding a number of times of abnormal combustion during a past trip to the current trip number of times of abnormal combustion Nnow (hereinafter referred to also as "a cumulative number of times of abnormal combustion Nsum"), whether or not there is a malfunction in the engine. More specifically, when the cumulative number of times of abnormal combustion Nsum is equal to or larger than the threshold number of times N1, the engine malfunction determination unit 420 determines that the engine 100 malfunction is occurred. Otherwise, the engine malfunction determination unit 420 determines that the engine 100 is normal.

During the CD mode, the frequency with which the engine 100 operates is lower than during the CS mode. For example, in the case where a trip of running a relatively short distance from an almost fully charged state of the battery 310 is repeated, the CD mode may be selected in an almost entire period during each trip. In this case, the number of times of rotation of the engine may not reach the determination required number of times of rotation (=n1×N1 times) during each trip. Thus, when "the CS malfunction determination processing" is performed to determine, through the use of the current trip number of times of abnormal combustion Nnow, whether or not there is a malfunction in the engine during the CD mode, the current trip ends before the number of times of rotation of the engine reaches the determination required number of times of rotation. As a result, it may become impossible to make a determination on a malfunction in the engine in an early stage.

In this embodiment of the invention, during the CD mode, "the CD malfunction determination processing" is performed to determine, through the use of the cumulative number of times of abnormal combustion Nsum since the past trip instead of the current trip number of times of abnormal combustion Nnow, whether or not there is a malfunction in the engine.

When the cumulative number of times of abnormal combustion Nsum is simply used, it is more likely to be determined that the engine 100 malfunction is occurred and the determination accuracy is lower than in the case where the current trip number of times of abnormal combustion Nnow is used. The engine malfunction determination unit 420 according to this embodiment of the invention performs a processing of resetting the cumulative number of times of abnormal combustion Nsum and the cumulative number of times of rotation of the engine, when the cumulative number of times of rotation of the engine from the past trip to the present reaches an upper-limit number of times of rotation. This upper-limit number of times of rotation needs to be set at least larger than the determination required number of times of rotation. For example, in the case where the determination required number of times of rotation is 4000, the upper-limit number of times of rotation can be set to 10000.

Figure 4:
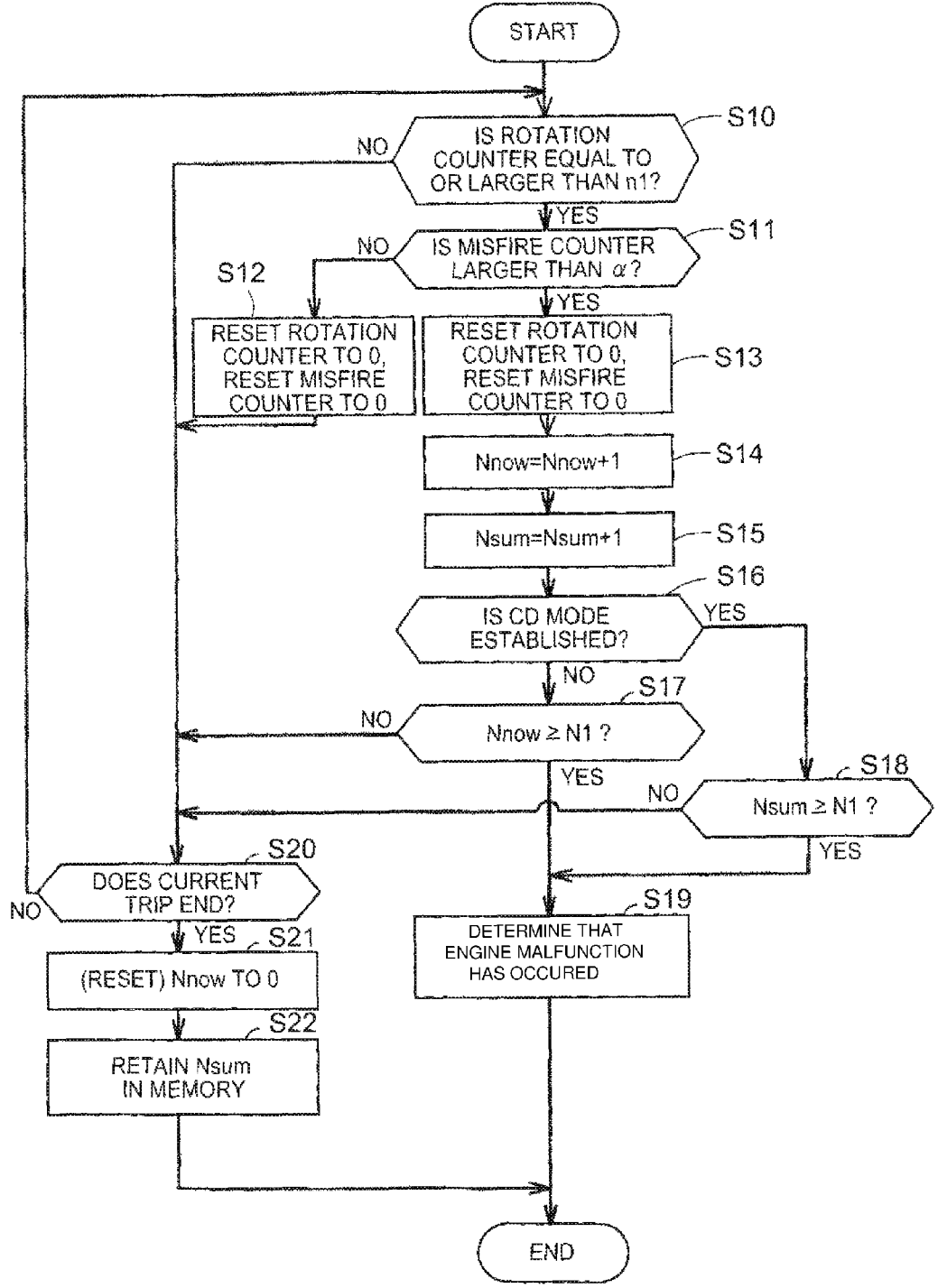
FIG. 4 is a (first) flowchart showing a processing procedure of the ECU according to the embodiment of the invention.

FIG. 4 is a flowchart showing an example of a processing procedure in the case where the ECU 400 performs the aforementioned malfunction determination processing. This flowchart is started after the engine 100 first rotates the reference number of times n1 (hereinafter referred to also as "after first-time n1 rotation") after activation of the vehicle system.

In step S10, the ECU 400 determines whether or not a rotation counter has reached the reference number of times n1. The rotation counter is a parameter indicating the number of times of rotation of the engine, and is increased by 1 every time the engine rotates by 360°.

When the rotation counter reaches the reference number of times n1 (YES in step S10), the ECU 400 determines in step S11 whether or not a misfire counter has exceeded the predetermined value α. The misfire counter is a parameter indicating the number of times of determination that a misfire has occurred in at least one cylinder of the engine 100. The misfire counter is increased by 1, for example, every time a rotation vibration amount that is obtained from a crank angle CA detected by the angle sensor 107 exceeds a threshold amount.

When the misfire counter is smaller than the predetermined value α (NO in step S11), the ECU 400 resets the rotation counter and the misfire counter to 0 in step S12, and then shifts the processing to step S20.

On the other hand, when the misfire counter has exceeded the predetermined value α (YES in step S11), the ECU 400 resets the rotation counter and the misfire counter to 0 in step S13, and then shifts the processing to step S14.

In step S14, the ECU 400 increases the current trip, number of times of abnormal combustion Nnow by 1. As described above, the current trip number of times of abnormal combustion Nnow is the number of times of abnormal combustion during the current trip (the number of times of determination that the number of times of misfire during n1 rotation has exceeded the predetermined value α). The initial value of the current trip number of times of abnormal combustion Nnow (the value at the time of the start of the current trip) is "0" (see step S21 that will be described later).

In step S15, the ECU 400 increases the cumulative number of times of abnormal combustion Nsum by 1. As described above, the cumulative number of times of abnormal combustion Nsum is a total number of times that is obtained by adding the number of times of abnormal combustion during the past trip to the current trip number of times of abnormal combustion Nnow. The initial value of the cumulative number of times of abnormal combustion Nsum (the value at the time of the start of the current trip) is not 0, but is a value of the cumulative number of times of abnormal combustion Nsum at the time point of the end of the last trip (see step S22 that will be described later).

In step S16, the ECU 400 determines whether or not the current control mode is the CD mode.

When the current control mode is the CS mode (NO in step S16), the ECU 400 determines in step S17 whether or not the current trip number of times of abnormal combustion Nnow is equal to or larger than the threshold number of times N1. Then, when the current trip number of times of abnormal combustion Nnow is equal to or larger than the threshold number of times N1 (YES in step S17), the ECU 400 determines in step S19 that the engine malfunction is occurred, and lights up the MIL. These processes constitute "the CS malfunction determination processing".

On the other hand, when the current control mode is the CD mode (YES in step S16), the ECU 400 determines in step S18 whether or not the cumulative number of times of abnormal combustion Nsum is equal to or larger than the threshold number of times N1. Then, when the cumulative number of times of abnormal combustion Nsum is equal to or larger than the threshold number of times N1 (YES in step S18), the ECU 400 determines in step S19 that the engine malfunction is occurred, and lights up the MIL. These processes constitute "the CD malfunction determination processing".

In step S10, the ECU 400 shifts the processing to step S20 in any case to determine whether or not the current trip ends: in the cases where when it is determined that the rotation counter has not reached the reference number of times n1 (NO in step S10), or after the rotation counter and the misfire counter have been reset in step S12 (after the process of step S12), or when it is determined in step S17 that the current trip number of times of abnormal combustion Nnow has not exceeded the threshold number of times N1 (NO in step S17), or when it is determined in step S18 that the cumulative number of times of abnormal combustion Nsum has not exceeded the threshold number of times N1 (NO in step S18).

When the current trip continues instead of ending (NO in step S20), the ECU 400 returns the processing to step S10, and repeats the processes starting from step S10.

On the other hand, when the current trip ends (YES in step S20), the ECU 400 shifts the processing to step S21 and step S22.

In step S21, the ECU 400 resets the current trip number of times of abnormal combustion Nnow to 0. The value reset in this processing is used as an initial value of the current trip number of times of abnormal combustion in a subsequent trip.

In step S22, the ECU 400 retains the cumulative number of times of abnormal combustion Nsum at the moment in the memory. The value retained in this process is used as an initial value of the cumulative number of times of abnormal combustion Nsum in a subsequent trip.

Figure 5:
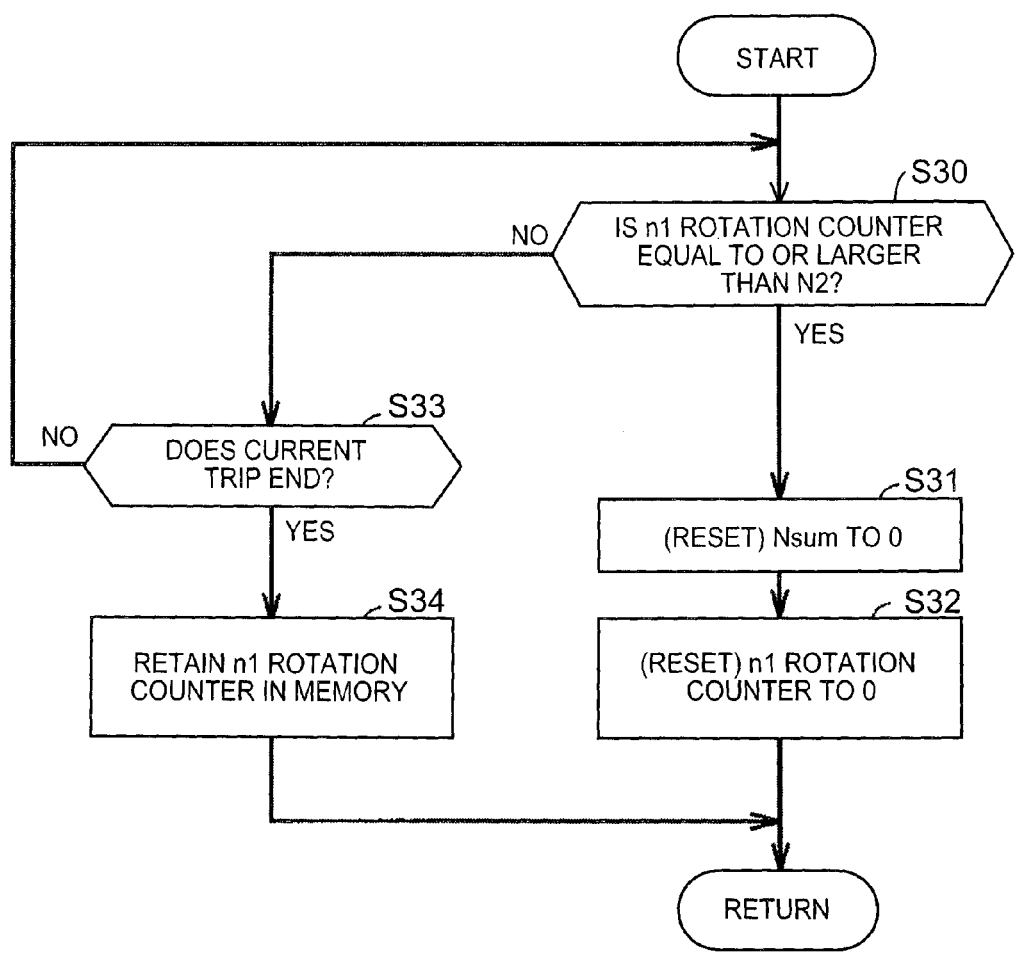
FIG. 5 is a (second) flowchart showing a processing procedure of the ECU according to the embodiment of the invention.

FIG. 5 is a flowchart showing a procedure of performing a processing of resetting the cumulative number of times of abnormal combustion Nsum. This flowchart is repeatedly executed on a predetermined cycle during the operation of the vehicle system.

In step S30, the ECU 400 determines whether or not the n1 rotation counter is equal to or larger than an upper-limit number of times N2. The n1 rotation counter is a parameter that is increased by 1 every time the engine 100 performs n1 rotation. It should be noted herein that the upper-limit number of times N2 is set to a value (e.g., 10 times) that is larger than the threshold number of times N1 (e.g., 4 times).

When the n1 rotation counter is equal to or larger than the upper-limit number of times N2 (YES in step S30), namely, when the cumulative number of times of engine rotation, is equal to or larger than n1×N2, the ECU 400 resets the cumulative number of times of abnormal combustion Nsum to 0 in step S31. In step S32, the ECU 400 resets the n1 rotation counter to 0.

When the n1 rotation counter is smaller than the upper-limit number of times N2 (NO in step S30), the ECU 400 determines in step S33 whether or not the current trip ends.

When the current trip does not end (NO in step S33), the ECU 400 returns the processing to step S30, and repeats the processes starting from step S30.

When the current trip ends (YES in step S33), the ECU 400 retains the n1 rotation counter at the moment in the memory in step S34. The value retained in this process is used in a subsequent trip as well.

Figure 6:
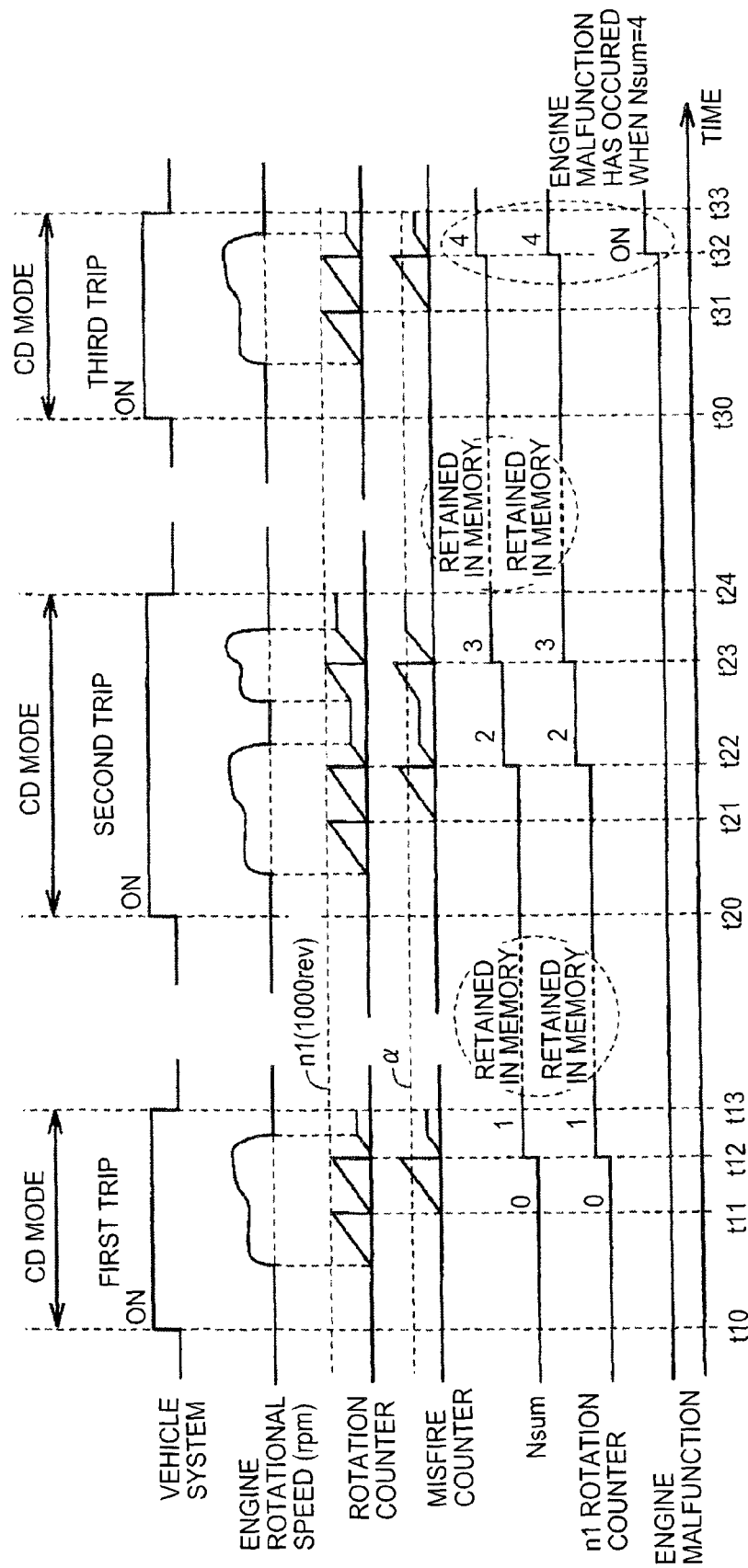
FIG. 6 is a view for illustrating a CD malfunction determination processing according to the embodiment of the invention.

FIG. 6 is a view for illustrating the CD malfunction determination processing. FIG. 6 shows a case where the reference number of times n1=1000 and the threshold number of times N1=4. FIG. 6 shows a case where the CD mode is selected in an entire period of each of first to third trips.

In the first trip that is started at a time t10, the CD malfunction determination processing is started at a time t11 after the first-time n1 rotation. When the rotation counter then reaches 1000 times of rotation at a time t12, the n1 rotation counter is increased from an initial value "0" to "1", and the cumulative number of times of abnormal combustion Nsum is increased from the initial value "0" to "1" because the misfire counter has exceeded the predetermined value α. Then at a time t13, the value "1" of the cumulative number of times of abnormal combustion Nsum and the value "1" of the n1 rotation counter at a time point of the end of the first trip are retained in the memory.

In the second trip that is started at a time t20 as well, the CD malfunction determination processing is started at a time t21 after the first-time n1 rotation. When the rotation counter then reaches 1000 times of rotation at a time t22, the n1 rotation counter is increased from the value "1" retained in the memory to "2", and the cumulative number of times of abnormal combustion Nsum is increased from the value "1" retained in the memory to "2" because the misfire counter has exceeded the predetermined value α. When the rotation counter then reaches 1000 times of rotation again at a time t23, the n1 rotation counter is increased from "2" to "3", and the cumulative number of times of abnormal combustion Nsum is increased from "2" to "3" because the misfire counter has exceeded the predetermined value α. Then at a time t24, the value "3" of the cumulative number of times of abnormal combustion Nsum and the value "3" of the n1 rotation counter at a time point of the end of the second trip are retained in the memory.

In the third trip that is started at a time t30 as well, the CD malfunction determination processing is started at a time t31 after the first-time n1 rotation. When the rotation counter then reaches 1000 times of rotation at a time t32, the n1 rotation counter is increased from the value "3" retained in the memory to "4", and the cumulative number of times of abnormal combustion Nsum is increased from the value "3" retained in the memory to "4" because the misfire counter has exceeded the predetermined value α. At this time t32, the cumulative number of times of abnormal combustion Nsum has reached "4" (=the threshold number of times N1). Therefore, it is determined that the engine malfunction is occurred, and the MIL is lit up.

In this manner, during each of the first to third trips, the CD mode in which the frequency with which the engine 100 operates is low is selected. Therefore, in each of the trips alone, the number of times of rotation of the engine is smaller than the determination required number of times of rotation (n1×N1=1000×4=4000 times). Thus, during any of the trips, the current trip number of times of abnormal combustion Nnow does not exceed 4 times (=the threshold number of times N1). On the other hand, in this embodiment of the invention, during the CD mode, the malfunction determination processing is performed through the use of the cumulative number of times of abnormal combustion Nsum since the past trip instead of the current trip number of times of abnormal combustion Nnow. Thus, during the CD mode in which the frequency with which the engine 100 operates is low as well, it can be appropriately determined in an early stage whether or not there is a malfunction in the engine 100.

FIG. 7 is a view for illustrating the processing of resetting the cumulative number of times of abnormal combustion Nsum. FIG. 7 shows a case where the reference number of times n1=1000, the threshold number of times N1=4, and the upper-limit number of times N2=10. FIG. 7 shows a case where the CD mode is selected in an entire period during each of the first to sixth trips.

In the first trip that is started at the time t10, the CD malfunction determination processing is started at the time t11 after the first-time n1 rotation. When the rotation counter then reaches 1000 times of rotation at the time t12, the n1 rotation counter is increased from the initial value "0" to "1", but the cumulative number of times of abnormal combustion Nsum is held equal to the initial value "0" because the misfire counter is smaller than the predetermined value α. Then at the time t13, the value "0" of the cumulative number of times of abnormal combustion Nsum and the value "1" of the n1 rotation counter at the time point of the end of the first trip are retained in the memory.

In the second trip that is started at the time t20, the CD malfunction determination processing is started at the time t21 after the initial n1 rotation. When the rotation counter then reaches 1000 times of rotation at the time t22, the n1 rotation counter is increased from the value "1" retained in the memory to "2", and the cumulative number of times of abnormal combustion Nsum is increased from the value "0" retained in the memory to "1" because the misfire counter has exceeded the predetermined value α. When the rotation counter then reaches 1000 times of rotation again at the time t23, the n1 rotation counter is increased from "2" to "3", but the cumulative number of times of abnormal combustion Nsum is held equal to "1" because the misfire counter is smaller than the predetermined value α. Then at the time t24, the value "1" of the cumulative number of times of abnormal combustion Nsum and the value "3" of the n1 rotation counter at the time point of the end of the second trip are retained in the memory.

This processing is repeated, and a case where the n1 rotation counter is "9" and the cumulative number of times of abnormal combustion Nsum remains equal to "1" at the time of the second trip at the time point of the end of a fifth trip is assumed.

When the sixth trip is started at a time t60, the CD malfunction determination processing is started at a time t61 after the initial n1 rotation. When the rotation counter then reaches 1000 times of rotation at a time t62, the n1 rotation counter is increased from the value "9" retained in the memory to "10", and the cumulative number of times of abnormal combustion Nsum is held equal to "1" because the misfire counter is smaller than the predetermined value α. At this time t62, the n1 rotation counter has reached "10" (=the upper-limit number of times N2). Therefore, the cumulative number of times of abnormal combustion Nsum and the n1 rotation counter are reset to 0.

In this manner, even in the case where the n1 rotation counter reaches "10" (=the upper-limit number of times N2) (i.e., even in the case where the cumulative number of times of rotation of the engine reaches n1×N2=1000×10=10000 times) in each of the first to sixth trips, when the cumulative number of times of abnormal combustion Nsum is smaller than "4" (=the threshold number of times N1), it is determined that the engine 100 is normal, and the cumulative number of times of abnormal combustion Nsum is reset. Thus, the cumulative number of times of abnormal combustion Nsum can be suppressed from being retained for an unduly long period, and an erroneous determination that the engine malfunction can be suppressed from becoming likely.

As described above, according to this embodiment of the invention, during the CS mode in which the frequency with which the engine operates is relatively high, the CS malfunction determination processing is performed through the use of the current trip number of times of abnormal combustion Nnow, whereby a determination on a malfunction in the engine can be appropriately made in an early stage. On the other hand, during the CD mode in which the frequency with which the engine operates is relatively low, the CD malfunction determination processing is performed through the use of the cumulative number of times of abnormal combustion Nsum, whereby a determination on a malfunction in the engine can be made in an early stage to suppress the detection of a malfunction in the engine from being delayed.

In this embodiment of the invention, the case where the CD malfunction determination processing is performed instead of the CS abnormality determination processing during the CD mode has been described. However, the invention is not limited to this configuration, but may be configured to perform the CD malfunction determination processing in addition to the CS malfunction determination processing during the CD mode.

In this embodiment of the invention, the case where the CS malfunction determination processing is performed during the CS mode and the CD malfunction determination processing is performed during the CD mode has been described. However, the invention is not limited to this configuration, but may be configured to perform the CD malfunction determination processing regardless of the control mode.

The embodiment of the invention disclosed herein should be considered to be exemplary in all respects and not restrictive. The scope of the invention is defined not by the foregoing description but by the claims. The invention is intended to encompass all alterations that are equivalent in significance and scope to the claims.

The invention claimed is:

1. A vehicle comprising:
    an engine;
    a motor;
    a battery configured to store an electric power for driving the motor; and
    an electronic control unit (ECU) configured to control the engine and the motor in a selected one of the following modes: (i) a charge sustaining mode in which the engine is allowed to be driven to hold a state of charge of the battery within a predetermined range, and (ii) a charge depleting mode in which the engine is not allowed to be driven to hold the state of charge of the battery within the predetermined range,
    wherein the ECU is configured to determine whether a current mode is the charge sustaining mode or the charge depleting mode,
    the ECU being configured to execute a first determination to determine that an engine malfunction has occurred when the number of times of abnormal combustion occurring during a current trip is equal to or larger than a threshold, during the charge sustaining mode, and
    the ECU being configured to execute a second determination to determine that the engine malfunction has occurred when the cumulative number of times of abnormal combustion is equal to or larger than the threshold, the second determination being executed instead of the first determination during the charge depleting mode, the cumulative number of times of abnormal combustion being obtained by adding the number of times of abnormal combustion occurring during a past trip to the number of times of abnormal combustion occurring during the current trip, wherein the ECU resets the cumulative number of times of abnormal combustion when the cumulative number of times of rotation of the engine since the past trip reaches a predetermined number of times of rotation;

the number of times of abnormal combustion occurring during the current trip is stored in the ECU, and the stored number of times of abnormal combustion is used as the number of times of abnormal combustion occurring during the past trip at a next trip;

the number of times of abnormal combustion occurring during the current trip is reset by the ECU after being stored in the ECU.

2. The vehicle according to claim 1, wherein the ECU determines whether or not there is an abnormal combustion every time the engine rotates a reference number of times, and increases the number of times of abnormal combustion occurring during the current trip every time the ECU determines that the abnormal combustion has occurred.

3. The vehicle according to claim 1 that is configured as a plug-in hybrid vehicle that allows the battery to be charged with an electric power of an external power supply.

4. A control apparatus for a vehicle that is equipped with an engine, a motor, and a battery, the control apparatus comprising:

an electronic control unit (ECU) configured to control the engine and the motor in a selected one of the following modes: (i) a charge sustaining mode in which the engine is allowed to be driven on a basis of a state of charge of the battery, and (ii) a charge depleting mode in which the engine is not allowed to be driven on a basis of the state of charge of the battery, wherein the ECU is configured to determine whether a current mode is the charge sustaining mode or the charge depleting mode, the ECU being configured to execute a first determination to determine that an engine malfunction has occurred when the number of times of abnormal combustion occurring during a current trip is equal to or larger than a threshold, during the charge sustaining mode, and the ECU being configured to execute a second determination to determine that the engine malfunction has occurred when the cumulative number of times of abnormal combustion is equal to or larger than the threshold, the second determination being executed instead of the first determination during the charge depleting mode, the cumulative number of times of abnormal combustion being obtained by adding the number of times of abnormal combustion occurring during a past trip to the number of times of abnormal combustion occurring during the current trip, wherein the ECU resets the cumulative number of times of abnormal combustion when the cumulative number of times of rotation of the engine since the past trip reaches a predetermined number of times of rotation;

the number of times of abnormal combustion occurring during the current trip is stored in the ECU, and the stored number of times of abnormal combustion is used as the number of times of abnormal combustion occurring during the past trip at a next trip;

the number of times of abnormal combustion occurring during the current trip is reset by the ECU after being stored in the ECU.

5. The control apparatus according to claim 4, wherein the ECU resets the cumulative number of times of abnormal combustion when the cumulative number of times of rotation of the engine since the past trip reaches a predetermined number of times of rotation.

6. The control apparatus according to claim 4, wherein the electronic control unit determines whether or not there is an abnormal combustion every time the engine rotates a reference number of times, and increases the number of times of abnormal combustion occurring during the current trip every time the ECU determines that the abnormal combustion has occurred.

7. A control method for a vehicle that is equipped with an engine, a motor, and a battery, and an electronic control unit (ECU), the method comprising:

controlling, by the ECU, the engine and the motor in a selected one of the following modes: (i) a charge sustaining mode in which the engine is allowed to be driven on a basis of a state of charge of the battery, and (ii) a charge depleting mode in which the engine is not allowed to be driven on a basis of the state of charge of the battery;

determining, by the ECU, whether a current mode is the charge sustaining mode or the charge depleting mode, making, by the ECU, a first determination to determine that the engine malfunction has occurred when the number of times of abnormal combustion occurring during a current trip is equal to or larger than a threshold, during the charge sustaining mode; and making, by the ECU, a second determination to determine that the engine malfunction has occurred when the cumulative number of times of abnormal combustion is equal to or larger than the threshold, the second determination being executed instead of the first determination during the charge depleting mode, the cumulative number of times of abnormal combustion being obtained by adding the number of times of abnormal combustion occurring during a past trip to the number of times of abnormal combustion occurring during the current trip, wherein the ECU resets the cumulative number of times of abnormal combustion when the cumulative number of times of rotation of the engine since the past trip reaches a predetermined number of times of rotation;

the number of times of abnormal combustion occurring during the current trip is stored in the ECU, and the stored number of times of abnormal combustion is used as the number of times of abnormal combustion occurring during the past trip at a next trip;

the number of times of abnormal combustion occurring during the current trip is reset by the ECU after being stored in the ECU.

* * * * *